US009235243B2

(12) United States Patent
Yeung

(10) Patent No.: US 9,235,243 B2
(45) Date of Patent: Jan. 12, 2016

(54) THERMAL PROFILE OPTIMIZATION TECHNIQUES

(71) Applicant: Acer Incorporated, New Taipei (TW)

(72) Inventor: Sip Kim Yeung, New Taipei (TW)

(73) Assignee: Acer Incorporated, New Taipei (TW)

(*) Notice: Subject to any disclaimer, the term of this patent is extended or adjusted under 35 U.S.C. 154(b) by 633 days.

(21) Appl. No.: 13/649,356

(22) Filed: Oct. 11, 2012

(65) Prior Publication Data

US 2014/0013098 A1 Jan. 9, 2014

(30) Foreign Application Priority Data

Jul. 4, 2012 (TW) .............................. 101123983 A

(51) Int. Cl.
| | |
|---|---|
| G06F 1/26 | (2006.01) |
| G06F 1/20 | (2006.01) |
| G06F 1/32 | (2006.01) |
| G06F 9/48 | (2006.01) |
| G06F 11/30 | (2006.01) |

(52) U.S. Cl.
CPC .............. *G06F 1/206* (2013.01); *G06F 1/3203* (2013.01); *G06F 9/4893* (2013.01); *G06F 11/3058* (2013.01); *G06F 2201/81* (2013.01); *Y02B 60/1217* (2013.01); *Y02B 60/1275* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 2005/0278520 A1* | 12/2005 | Hirai et al. .............. | G06F 1/206 713/1 |
| 2007/0124609 A1 | 5/2007 | Lee | |
| 2009/0044545 A1* | 2/2009 | Shapiro .......................... | 62/3.3 |
| 2011/0191776 A1* | 8/2011 | Bose et al. .................... | 718/102 |
| 2011/0233999 A1* | 9/2011 | Browning ...................... | 307/31 |
| 2011/0264938 A1* | 10/2011 | Henroid et al. ............... | 713/323 |

FOREIGN PATENT DOCUMENTS

| | | |
|---|---|---|
| CN | 101025641 A | 8/2007 |
| TW | 200745810 | 4/1996 |
| TW | 200837547 A | 9/2008 |

OTHER PUBLICATIONS

Taiwan Office Action, Jun. 11, 2014, 13 pages.
Fleming, et al., "Enabling Always on, Always Connected (AOAC) Computing with Bluetooth Technology", Intel Technology Journal Q2, 2000, pp. 1-7.
"Advanced Configuration and Power Interface Specification", Hewlett-Packard Corporation, Intel Corporation, Microsoft Corporation, Phoenix Technologies Ltd., Toshiba Corporation, Revision 5.0, Dec. 6, 2011, 958 pages.
Chinese Office Action dated Jul. 23, 2015, 11 pages.

* cited by examiner

*Primary Examiner* — Kim Huynh
*Assistant Examiner* — Paul J Yen
(74) *Attorney, Agent, or Firm* — Edell, Shapiro & Finnan, LLC

(57) ABSTRACT

Techniques are provided for optimizing performance of a processor. The techniques may be embodied as a method, an electronic device or a computer-readable storage media with instructions executable to perform the method. In summary, processing operations performed by a processor are identified. Each of the processing operations is evaluated to determine a resulting thermal profile associated with each of the processing operations. Based on the thermal profile associated with each of the processing operations, one or more of the processing operations are grouped in a set of processing operations to be performed together between idle times of the processor. The processing operations in the set are performed at a second speed that is higher than a first speed.

19 Claims, 7 Drawing Sheets

THERMAL PROFILE OPTIMIZATION TECHNIQUES

TECHNICAL FIELD

The present disclosure relates generally to optimizing power usage of a processor.

BACKGROUND

Many next generation electronic devices are being configured as always-on always-connected (AOAC) devices. Since these devices remain "on" for long durations of time, it is important to maximize the power consumption of these devices. However, high thermal profiles due to heat dissipation within the devices drain the battery lifetime and degrade performance of the devices. The Converge Platform Power Management (CPPM) protocol attempts to minimize power consumption of AOAC devices by assigning processing components to corresponding processing states that have varying power loads.

SUMMARY

Techniques are provided for optimizing performance of a processor. The techniques may be embodied as a method, an electronic device or a computer-readable storage media with instructions executable to perform the method. In summary, processing operations performed by a processor are identified. Each of the processing operations is evaluated to determine a resulting thermal profile associated with each of the processing operations. Based on the thermal profile associated with each of the processing operations, one or more of the processing operations are grouped in a set of processing operations to be performed together between idle times of the processor. The processing operations in the set are performed at a second speed that is higher than a first speed so as to increase idle time between sets of processing operations.

DESCRIPTION OF EXAMPLE EMBODIMENTS

Figure 1:
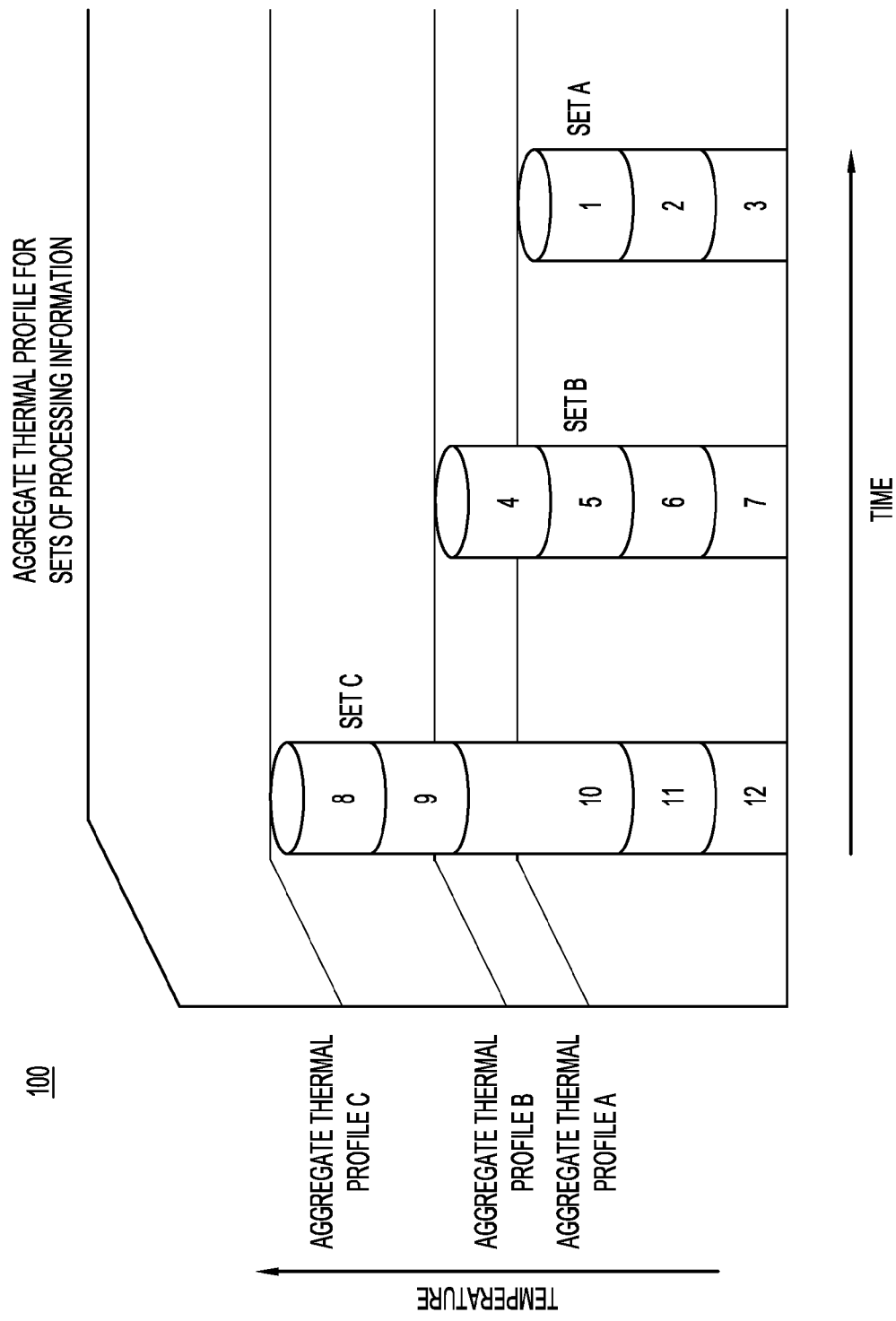
FIG. 1 shows a chart depicting example thermal profiles for sets of processing operations performed by a processor.

The techniques described hereinafter involve grouping operations performed by a processor of an electronic device ("device") to optimize the processor performance. In general, a processor is configured to perform several processing operations ("operations") in order to complete one or more computing tasks. For example, a processor of a mobile device or computing device may send and receive video communications with other mobile or computing devices, and thus, in order to accomplish the tasks associated with these communications, the processors of the devices may need to perform multiple processing operations. In one example, the processor may need to perform operations such as Wi-Fi/mobile data connection (3G/4G), global positioning system (GPS) operations, screen displays, audio and video/camera input and output operations, etc. Processors may perform a series of operations based on the required tasks. Each of the operations capable of being performed by the processor may, however, require different power loads, and thus, some processing operations may be more power or processing intensive than other operations. Likewise, each of these operations capable of being performed by the processor may also have different thermal loads, and thus, performing these operations may result in varying levels of heat dissipation within the electronic devices. In one example, as understood hereinafter, each processing operation has a thermal load or "thermal profile" that corresponds to the heat dissipated by the processor (i.e., temperature) over a period of time when the processor performs the operation. The processor also has a thermal profile (referred to as an "overall thermal profile") that corresponds to the heat dissipated by the processor over a period of time of performing all or selected ones of the processing operations.

Certain devices, however, may be configured such that processing operations performed by the processor are grouped together into sets based on the characteristics of the operations and the power loads and thermal profiles of the operations. Processing operations may be grouped together into sets in order to save processing power and/or in order to reduce the overall thermal profile of the processor. Some operations may have lower power loads (e.g., they consume less power when being performed by the processor) than other operations, and thus in a "low power mode," the operations with low power loads may be grouped together to ensure a lower power usage by the processor. One example of these grouping techniques is described by the Converge Platform Power Management (CPPM) protocol (e.g., "CPPM boost") that is used to optimize power for always-on always-connected (AOAC) devices.

Likewise, some operations may have lower thermal profiles than other operations. Thus, as described by the techniques herein, in a "low thermal mode," the processing operations with low thermal profiles may be grouped together to ensure a low overall thermal profile of the processor of an electronic device. Additionally, after processing operations have been grouped into sets, the overall thermal profile of the processor may be further reduced, as one or more of the sets may be selected to be performed at increased processing speeds (e.g., a "turbo" or "boost" mode of the processor that increases the clock data rate of the processor) and/or by changing the number of processor cores to be performed on the selected sets.

Processing operations may be grouped together in order to perform certain tasks. For example, when a device is in a "sleep" or "hibernate" mode, the essential processing operations may be grouped together to ensure that the device stays on, while enhanced processing operations may be grouped together to be performed at a later time after the processor "awakens" from the sleep or hibernate mode. Likewise, processing operations may be grouped together to ensure longer periods of "idle times" of a processor. Idle times of the processor, in general, correspond to idle states of the processor, where the processor is performing minimum or only essential processing operations (and thus is consuming less power and dissipating less heat). In one example, the idle times of the processor may be present when the device is a sleep or hibernate mode.

Reference is now made to FIG. 1. FIG. 1 shows a chart 100 depicting example thermal profiles associated with sets of processing operations. In FIG. 1 processing operations are grouped into three sets of processing operations—Set A, Set B and Set C, though it should be appreciated that the operations may be grouped into any number of sets. Each of the sets comprises one or more processing operations. For example, Set A comprises processing operations 1, 2 and 3, Set B comprises processing operations 4, 5, 6 and 7 and Set C comprises processing operations 8, 9, 10, 11 and 12. Just as each processing operation has a corresponding thermal profile, each set of processing operations also has a corresponding thermal profile. The thermal profile of the sets of processing operations is referred to hereinafter as the "aggregate thermal profile" for the corresponding set. The aggregate thermal profile for each set is determined, for example, by the thermal profiles associated with the component processing operations in each set. The aggregate thermal profile for each set is determined based on the heat dissipated by the processor when performing the operations in the set over a period of time. As shown in FIG. 1, Set A has an aggregate thermal profile corresponding to, e.g., temperature "A," Set B has an aggregate thermal profile corresponding to, e.g., temperature "B" and Set C has an aggregate thermal profile corresponding to, e.g., temperature C.

Figure 2:
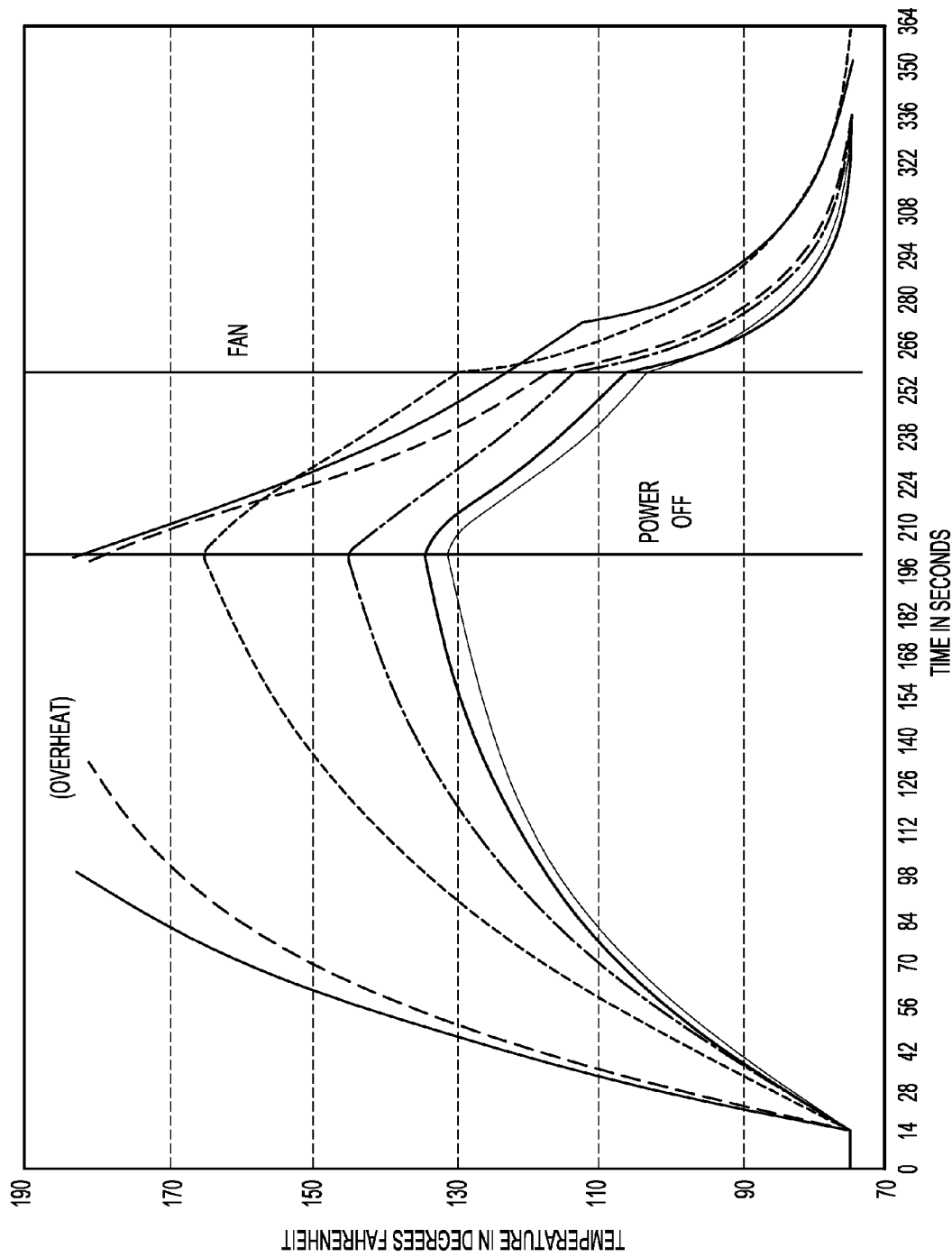
FIG. 2 shows a chart depicting different overall thermal profiles for the processor based on the processing operations performed.

Reference is now made to FIG. 2, which shows a chart 200 of different overall thermal profiles for the processor based on the sets processing operations performed. That is, FIG. 2 shows a plurality of temperature plots over time (corresponding to different sets of processing operations and/or processing speeds), and the overall temperature profile associated each temperature plot can be determined by the "area under the curve" (i.e., the integration or summation) of the particular plot over the period of time. As stated above, performing different processing operations may result in different overall thermal profiles of the processor, based on the individual thermal profiles associated with each processing operation being performed. Likewise, performing different sets of processing operations also results in different overall thermal profiles of the processor, based on the aggregate thermal profile associated with individual sets of operations being performed. The processor has a lower overall thermal profile when it performs processing operations that have lower individual thermal profiles and/or when it performs sets of processing operations with lower aggregate thermal profiles.

Thus, to reduce or lower the overall thermal profile of the processor, it is advantageous to select processing operations and/or sets of processing operations with low thermal profiles but which still can perform the desired task. In other words, in order to enhance the performance of the electronic device, the overall thermal profile of the processor is optimized such that the processor of the electronic device can perform all of the necessary or requested operations while consuming low levels of power and dissipating low levels of heat, thus extending a life of a battery associated with the processor of the electronic device. When the overall thermal profile of the processor is lower, the processor consumers less power. Thus, the techniques described hereinafter involve grouping the processing operations into sets of processing operations in order to optimize the overall thermal profile of the processor (and accordingly reducing power consumption of the processor) while still enabling the processor to perform necessary tasks.

As shown in FIG. 2, depending on which processing operation/set of processing operations is performed, a temperature of the processor may go above a temperature threshold. The temperature threshold may set forth a maximum allowable temperature before cooling actions are required. For example, when the temperature of the processor goes above the temperature threshold, a fan unit or other cooling unit of the processor may be activated to cool the processor to reduce the temperature below the temperature threshold. In FIG. 2, the threshold temperature is shown, for example, as 170 degrees Fahrenheit, though this threshold may be any temperature. When the processor temperature is above 170 degrees Fahrenheit, the processor is in an "overheat" mode, thus requiring the fan unit of the electronic device to cool the processor below the threshold temperature.

Often times, the fan unit will cool the processor to a temperature such that the processor can perform processing operations and/or sets of processing operations at a lower temperature than would be performed without the fan unit being activated. For example, if the processor performs the processing operations in Set A (described above) at a first speed, the temperature of the processor may reach a maximum temperature of, e.g., 168 degrees Fahrenheit and may stay at elevated temperatures for a long duration of time without exceeding the temperature threshold. If, on the other hand, the processor performs the processing operations in Set A at a second speed, the temperature of the processor may initially reach a maximum temperature above the 170 degree Fahrenheit temperature threshold, but upon being cooled by the fan unit, the temperature of the processor may drop to a significantly lower temperature (e.g., 90 degrees Fahrenheit) and may stay at this lower temperature for a long duration of time. Thus, by activating the fan unit, the overall thermal profile of the processor may be lower than the overall thermal profile of the processor when the fan unit was not triggered but when the temperature also did not exceed the temperature threshold. Accordingly, it may be advantageous to "quickly" activate the fan unit (for example, in connection with operating the processor in the "turbo mode," as described below) in order to lower the overall thermal profile of the processor.

Figure 3:
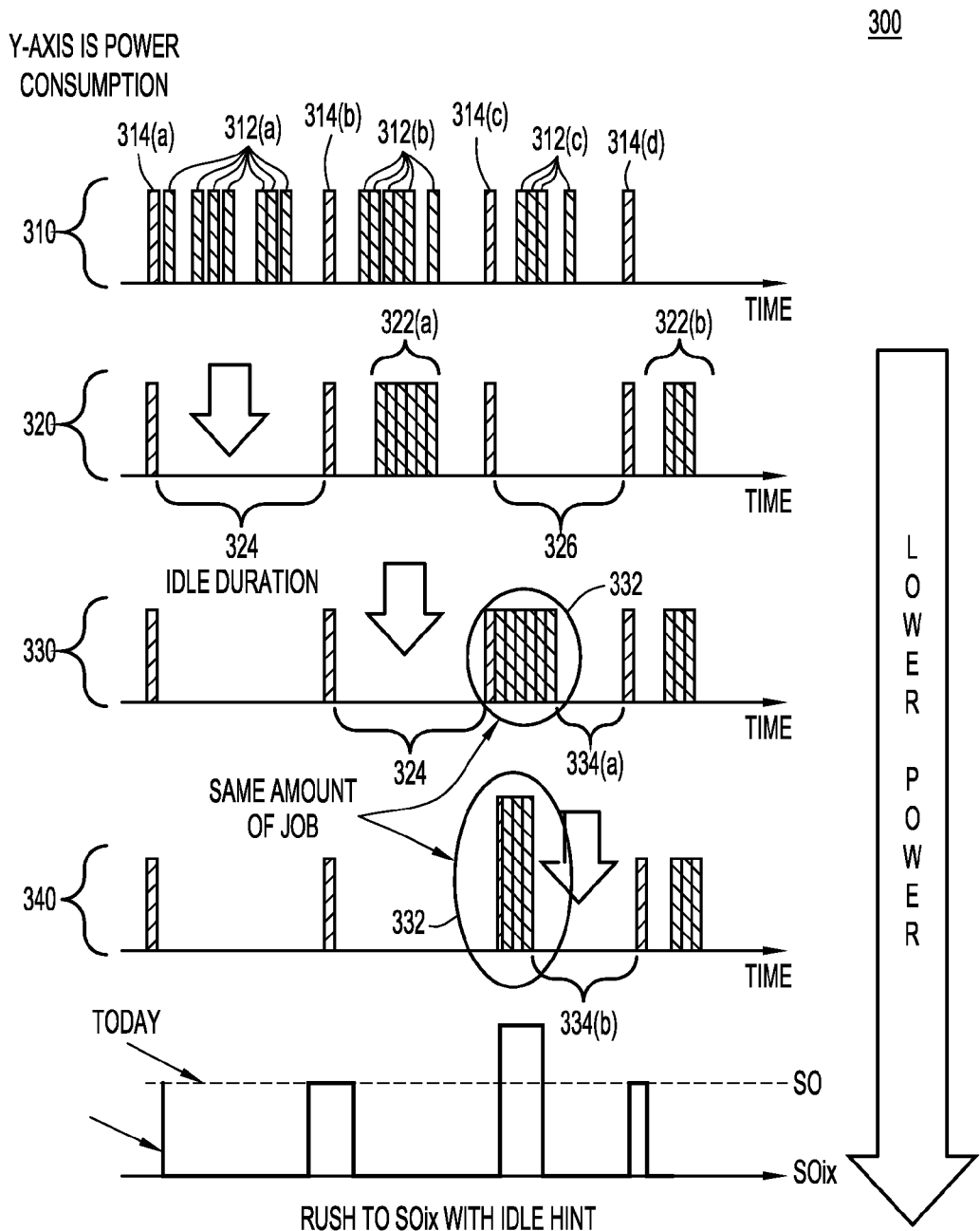
FIG. 3 shows graphical depictions of overall power profiles of the processor performing sets of operations.

Reference is now made to FIG. 3. FIG. 3 shows graphical depictions 300 of overall power profiles of the processor. The processor in FIG. 3 performs sets of processing operations. In graph 310, several processing operations, shown at reference numerals 312(a)-312(c), are performed by the processor in between system break events, which are shown at reference numerals 314(a)-314(d). In this graph, some of the processing operations are not grouped into sets and some of the processing operations are grouped into sets.

In graph 320, the processing operations are grouped into sets. These sets are shown at reference numerals 322(a) and 322(b). By grouping the processing operations into sets, the processor has longer durations of "idle times" (shown at reference numerals 324 and 326) between processing events, when compared to the idle times in graph 310. As stated above, the idle times of the processor correspond to low power states of the processor, and during the idle times, the processor is consuming low levels power and is dissipating low levels of heat. Accordingly, when the processor performs sets of operations that result in large idle times (before and/or after the processing), the overall thermal profile of the processor may be lower as when compared to the processor performing operations resulting in shorter periods of idle times. This may be true even when the processor is performing the same number of operations. In other words, the processor may perform the same number of operations in graph 310 and graph 320, but in graph 320, the overall power profile and overall thermal profile of the processor may be lower due to the longer periods of idle time in between processing operations.

These idle time durations can be further increased by increasing the speed of the processor. As a result, the power profiles and the overall thermal profiles can be further optimized. For example, in graph 330 of FIG. 3, a set of processing operations 332 is performed at a first speed, resulting in a subsequent idle time shown at reference numeral 334(a). In graph 340 of FIG. 3, the set of processing operations 332 is performed at a second speed (that is higher than the first speed, e.g., a turbo mode), resulting in a subsequent idle time 334(b). Idle time 334(b) is longer than the idle time 334(a), due to the short processing duration of the operations in the second speed. Thus, when the processor operates at the second, enhanced speed, even though the processor may consume more power (and thus dissipate more heat) over a shorter period of time of processing the operations, the overall power used and heat dissipated over the entire duration of processing time (which includes the idle times) is lower due to the large idle times. That is, by processing the set of processing operations 332 at the second speed, the length of the idle time is increased, which results in a lower overall thermal profile for the processor even though a power boost is needed over a short period of time to complete the processing at the second speed. As a result, by grouping the processing operations into sets and selectively boosting the processing speed of the processor to complete selected sets, the overall thermal profile of the processor can be lowered and optimized.

In addition to increasing the idle time duration, processing the operations in the set 332 at the second speed may "quickly" activate the fan unit of the electronic device. That is, the fan unit may be activated at an earlier point in time (e.g., due to a temperature spike resulting from the processor boost) in comparison to when the fan unit would be activated at the first speed. Thus, as stated above, the fan unit may cool the processor to a temperature such that the processor can perform the set of operations 332 at a lower average temperature (and thus resulting in a lower overall thermal profile) and over a shorter period of time than would be performed without the fan unit being activated.

Figure 4:
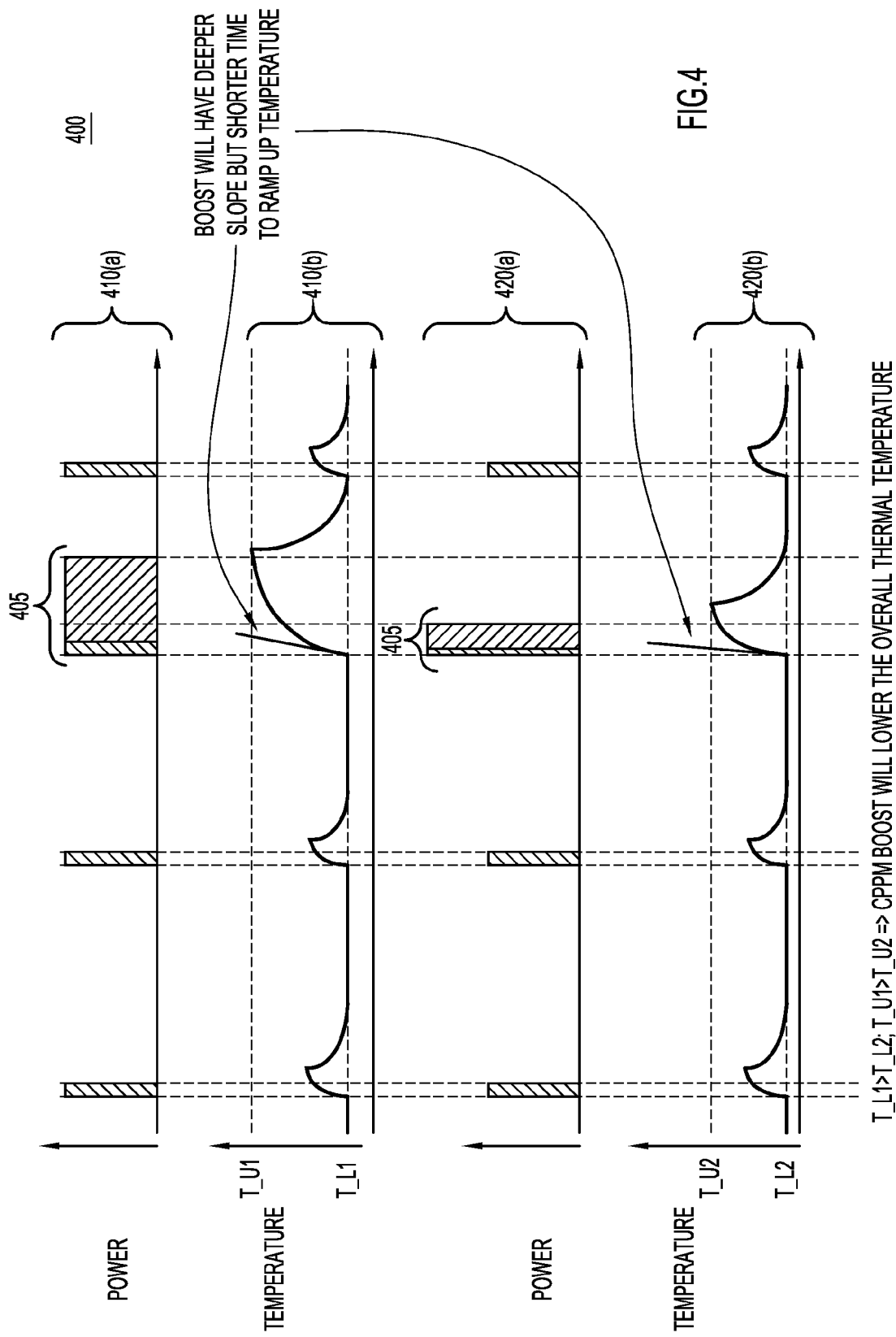
FIG. 4 shows graphical depictions of overall temperature profiles of the processor performing sets of operations.

Reference is now made to FIG. 4. FIG. 4 shows graphical depictions 400 of overall temperature profiles of the processor performing sets of operations. In graph 410(a), a set of processing operations 405 is performed by the processor at a first speed, resulting in a first corresponding overall thermal profile of the processor, shown in graph 410(b). In graph 410(b), the overall thermal profile of the processor is the temperature of the processor measured over time (i.e., the "area under the curve"/integral/summation of the temperature over the processing period of time). In graph 420(a), the set of processing operations 405 is performed by the processor at a second speed (e.g., "turbo speed") that is higher than the first speed resulting in a second corresponding overall thermal profile of the processor, shown in graph 420(b). The second overall thermal profile of the processor is lower relative to the first overall thermal profile of the processor, in part, due to the shorter time frame during which the processor is performing the operations in the set 405. In other words, when the processor performs the operations in the set 405 at the second speed, the aggregate thermal profile of the set 405 is lower than the aggregate thermal profile of the set 405. For example, when the operations are performed at the second speed, even though the processor may use more power (and thus dissipate more heat) during the processing boost, the processing of the operations occurs for a shorter period of time. Additionally, when the operations are performed at the second speed, the processing temperature at the enhanced speed may be sufficiently high to activate the fan unit of the electronic device such that the processor cools to a lower average temperature when compared to the processor without the fan unit being activated.

Thus, the thermal profile of the processor can be optimized at several levels. That is, processing operations may be initially grouped into sets of operations to increase the idle times for the processor, thus reducing the overall thermal profile for the processor. Additionally, after the processing operations are grouped into the sets, one or more of the sets may be operated at an enhanced or "turbo speed" so as to reduce further the overall thermal profile of the processor.

Figure 5:
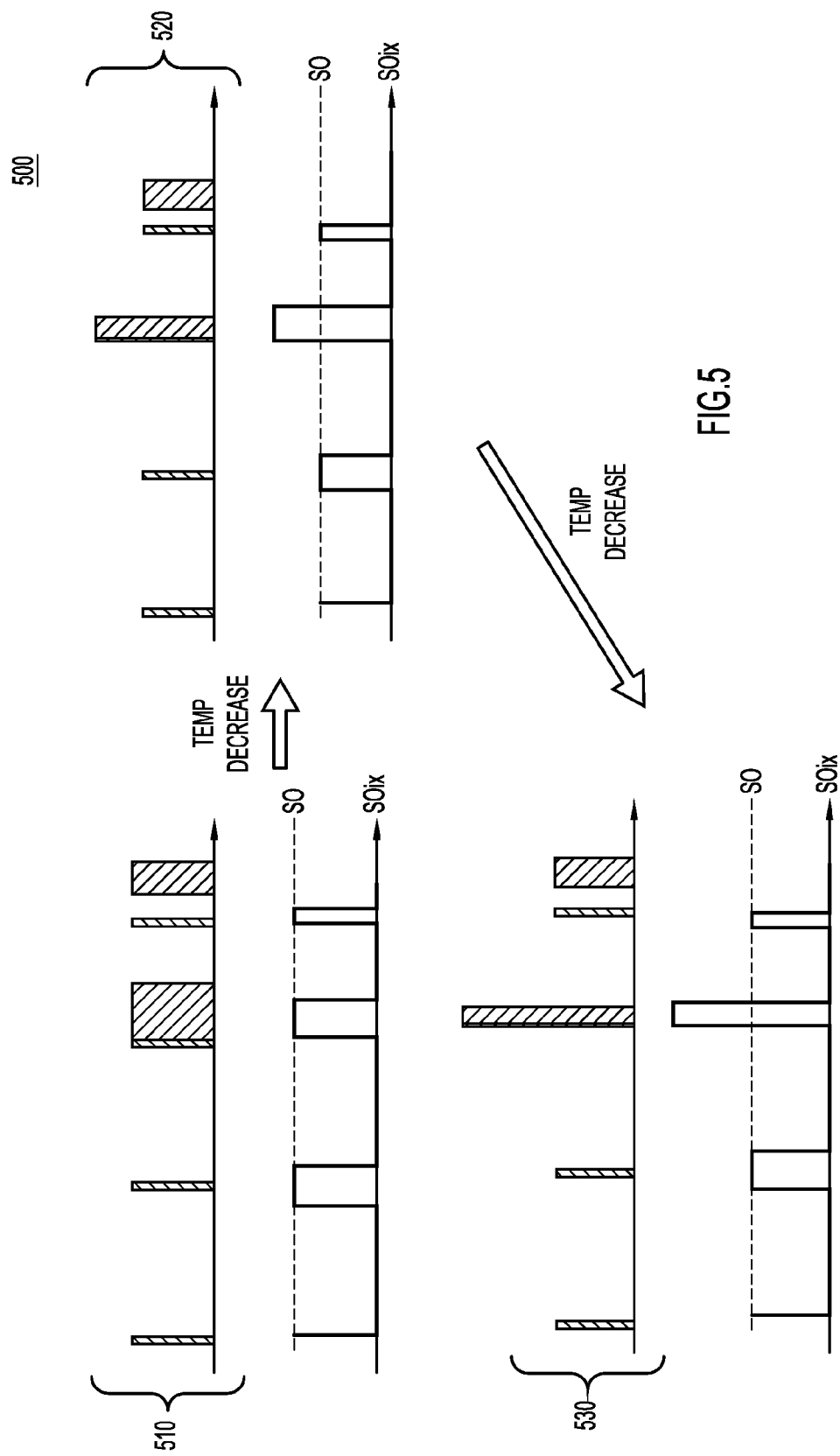
FIG. 5 shows the processor performing sets of processing operations at a plurality of speeds.

Reference is now made to FIG. 5. FIG. 5 shows charts 500 of the processor performing sets of processing operations at a plurality of speeds. Graph 510 in FIG. 5 shows the processor performing a set of processing operations at a first speed (resulting in a first overall thermal and power profile of the processor). Graph 520 in FIG. 5 shows the processor performing the set of operations at a second speed that is higher than the first speed (resulting in a second overall thermal and power profile of the processor that is lower than the first overall thermal and power profile). Graph 530 in FIG. 5 shows the processor performing the set of operations at a third speed that is higher than the first speed and the second speed (resulting in a third overall thermal and power profile of the processor that is lower than the first overall thermal and power profile and the second overall thermal and power profile).

It should be further appreciated that the techniques herein may also enable the processor to skip certain processing operations or sets of processing operations based on the thermal profile associated with the operations/sets. That is, the thermal profile of a particular processing operation or an aggregate thermal profile of a particular set of processing operations may be sufficiently high such that the processor skips the operation and/or set in order to conserve power consumption and in order to lower the overall thermal profile of the processor. For example, certain processing operations that are non-essential to a given task may be skipped based on the thermal profile associated with the processing operations.

Figure 6:
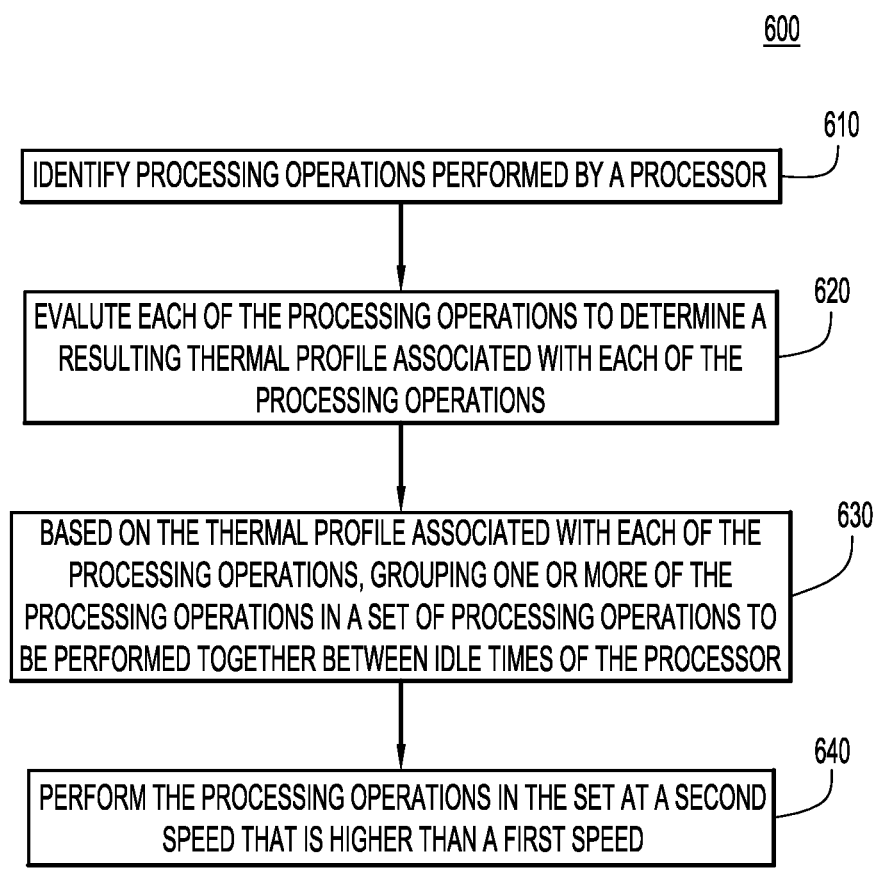
FIG. 6 shows an example flow chart depicting operations for optimizing the overall power consumption of the processor.

Reference is now made to FIG. 6. FIG. 6 shows an example flow chart 600 depicting operations for optimizing the overall thermal profile of the processor. At step 610, the processing operations performed by the processor are identified. At step 620, each of the processing operations is evaluated to determine a resulting thermal profile associated with each of the processing operations. These thermal profiles may be stored in a database, as described hereinafter. At step 630, based on the thermal profile associated with each of the processing operations, one or more of the processing operations are grouped in a set of processing operations to be performed together between idle times of the processor. At step 640, the processing operations in the set are performed at a second speed that is higher than a first speed.

It should be appreciated that the techniques described herein may enable processing operations to be grouped in accordance with similar grouping set forth in the CPPM protocol. These groupings are also referred to as "CPPM groupings." The CPPM groupings can be further optimized or categorized into subsets of groupings based on, for example, the aggregate thermal profiles associated the CPPM groupings. That is, the techniques described herein may be an enhancement of the CPPM protocol in order to further group and optimize the power usage of a processor based on the aggregate thermal profile of CPPM groupings.

Figure 7:
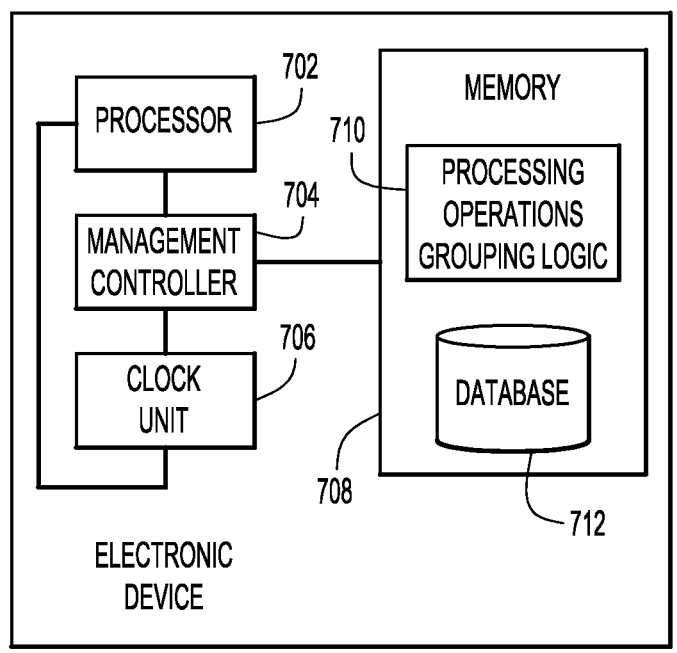
FIG. 7 shows a block diagram of the electronic device comprising the processor and logic performed by a management controller for optimizing the thermal profile of the processor.

Reference is now made to FIG. 7, which shows a block diagram of the electronic device 700, described above. The electronic device 700 comprises a processor 702, a management controller 704, a clock unit 706 and a memory 708. The processor 702 is configured to perform the processing operations, as described above. The management controller 704 is coupled to the processor 702, and is configured to evaluate the thermal profiles of the processing operations and to group the processing operations into sets in order to optimize thermal profile of the processor 702 as it processes of the operations. The management controller 704 may also evaluate the processing times associated with each of the processing operations to determine whether or not to group the processing operations into a set. For example, some processing operations may be time-intensive, and thus, the management controller 704 may determine that grouping that particular operation into a set may not have a significant effect on the overall thermal profile of the processor 702.

The clock unit 706 is coupled to the processor 702 and to the management controller 704, and is configured to set the processing speed of the processor 702. For example, as described above, processor 702 may operate at several processing speed levels. The management controller 704 can instruct the processor to operate at these different speed levels by changing the clock rate of the clock unit 706 associated with each of the processing operations.

The processor 702 and the management controller 704 may be microprocessors or microcontrollers that are configured to execute program logic instructions (i.e., software) for carrying out various operations and tasks described herein. In one example, the processor may be a dual-core processor or a quad-core processor and may be configured to utilize any number of processing cores to perform the techniques described above. The management controller 704 is configured to execute processing operations grouping logic 710 that is stored in the memory 708 to group the processing operations into sets and to perform the optimization operations, as described above. The memory 708 may comprise read only memory (ROM), random access memory (RAM), magnetic disk storage media devices, optical storage media devices, flash memory devices, electrical, optical or other physical/tangible memory storage devices.

The functions of the processor 702 and the management controller 704 may be implemented by logic encoded in one or more tangible computer readable storage media (e.g., embedded logic such as an application specific integrated circuit, digital signal processor instructions, software that is executed by a processor, etc.), wherein the memory 708 stores data used for the operations described herein and stores software or processor executable instructions that are executed to carry out the operations described above.

The processing operations grouping logic 710 may take any of a variety of forms, so as to be encoded in one or more tangible computer readable memory media or storage device for execution, such as fixed logic or programmable logic (e.g., software/computer instructions executed by a processor), and the processor 702 and the management controller 704 may be an application specific integrated circuit (ASIC) that comprises fixed digital logic, or a combination thereof.

For example, the processor 702 and the management controller 704 may be embodied by digital logic gates in a fixed or programmable digital logic integrated circuit, in which digital logic gates are configured to perform the operations of the processing operations grouping logic 710. In general, the processing operations grouping logic 710 may be embodied in one or more computer readable storage media encoded with software comprising computer executable instructions and when the software is executed operable to perform the operations described herein for the process logic 710.

The memory 708 also comprises a database 712, which is configured to store power profile and thermal profile information associated with the processing events. For example, the database 712 stores the thermal profile information associated with each processing event as well as the aggregate thermal profile information associated with sets of processing events. Furthermore, the database 712 stores the overall thermal profile of the processor 702 that results from the processing operations being grouped into the various sets and being performed at various processing speeds, as described above. The information in the database 712 can be retrieved by the management controller 704 and utilized to perform real-time modifications or optimizations to the overall thermal profile of the processor 702.

It should be appreciated that the techniques described above in connection with all of the embodiments may be performed by one or more computer readable storage media or devices encoded with software comprising computer executable instructions to perform the methods and operations described herein. For example, the operations performed by the processor 702 and the management controller 704 may be performed by one or more computer or machine readable storage media (non-transitory) or device executed by a processor and comprising software, hardware or a combination of software and hardware to perform the techniques described herein.

The above description is intended by way of example only. Various modifications and structural changes may be made therein without departing from the scope of the concepts described herein and within the scope and range of equivalents of the claims.

What is claimed is:

1. A method for optimizing performance of a processor, comprising:
    identifying processing operations performed by the processor;
    evaluating each of the processing operations to determine a resulting thermal profile associated with each of the processing operations;
    based on the thermal profile associated with each of the processing operations, grouping one or more of the processing operations in respective sets of processing operations to be performed together between idle times of the processor;
    rearranging an order in which to execute the respective sets of processing operations to lower an overall thermal profile of the processor relative to the thermal profile of the processor when executing the processing operations without being grouped in the respective sets; and
    performing the processing operations in at least one set at a second speed that is higher than a first speed so as to increase idle time between sets of processing operations.

2. The method of claim 1, wherein grouping comprises grouping the processing operations in the respective sets such that when the processing operations in the respective sets are performed together between idle times of the processor, an overall thermal profile of the processor is lower relative to the overall thermal profile of the processor when the processing operations are not grouped in the respective sets.

3. The method of claim 1, wherein performing comprises performing the processing operations in the at least one set at the second speed such that an aggregate thermal profile of the set of processing operations is lower relative to the aggregate thermal profile of the at least one set of processing operations when the processing operations in the at least one set are performed at the first speed.

4. The method of claim 3, wherein increasing the processing speed comprises increasing the processing speed such that an idle duration is increased between sets of processing operations.

5. The method of claim 3, wherein increasing the processing speed comprises changing a number of processor cores that are used to complete the processing operations.

6. The method of claim 3, wherein increasing the processing speed comprises increasing the processing speed by increasing a clock rate associated with each of the processing operations.

7. The method of claim 1, wherein evaluating comprises evaluating a processing time associated with each of the processing operations to determine whether or not to group the processing operations in a given set.

8. The method of claim 1, further comprising:
storing in a database the thermal profile associated with each of the processing operations, and storing in the database an aggregate thermal profile of the processing operations in the respective sets.

9. The method of claim 8, further comprising:
updating the database in response to a change in the thermal profile associated with any of the processing operations.

10. The method of claim 1, wherein grouping comprises grouping the one or more processing operations to the respective sets so as to extend a life of a battery associated with the processor.

11. The method of claim 1, wherein grouping comprises grouping the processing operations to the respective sets based on a grouping according to the Converge Platform Power Management (CPPM) protocol.

12. The method of claim 1, wherein the second speed is a turbo processing speed.

13. An electronic device, comprising:
a processor;
a clock unit, coupled to the processor;
a memory; and
a management controller unit, coupled to the memory and the processor, and configured to:
identify processing operations performed by the processor;
evaluate each of the processing operations to determine a resulting thermal profile associated with each of the processing operations;
group based on the thermal profile associated with each of the processing one or more of the processing operations in respective sets of processing operations to be performed together between idle times of the processor;
rearrange an order in which to execute the respective sets of processing operations to lower an overall thermal profile of the processor relative to the thermal profile of the processor when executing the processing operations without being grouped in the respective sets; and
perform the processing operations in at least one set at a second speed that is higher than a first speed so as to increase idle time between sets of processing operations.

14. The electronic device of claim 13, wherein the management controller unit is further configured to group the processing operations in the respective sets such that when the processing operations in the respective sets are performed together between idle times of the processor, an overall thermal profile of the processor is lower relative to the overall thermal profile of the processor when the processing operations are not grouped in the respective sets.

15. The electronic device of claim 13, wherein the management controller unit is further configured to perform the processing operations in the at least one set at the second speed such that an aggregate thermal profile of the at least one set of processing operations is lower relative to the aggregate thermal profile of the at least one set of processing operations when the processing operations in the at least one set are performed at the first speed.

16. The electronic device of claim 15, wherein the management controller unit is further configured to increase the processing speed such that an idle duration is increased between sets of processing operations.

17. The electronic device of claim 15, wherein the management controller is further configured to change a number of processor cores that are used to complete the processing operations.

18. The electronic device of claim 15, wherein the management controller is further configured to increase a clock rate associated with each of the processing operations.

19. The electronic device of claim 13, wherein the management controller is further configured to evaluate a processing time associated with each of the processing operations to determine whether or not to group the processing operations in the at least one set.

* * * * *